Feb. 25, 1964
A. J. TUCKER
3,122,398
MATERIAL HANDLING APPARATUS
Filed Dec. 6, 1961
2 Sheets-Sheet 1
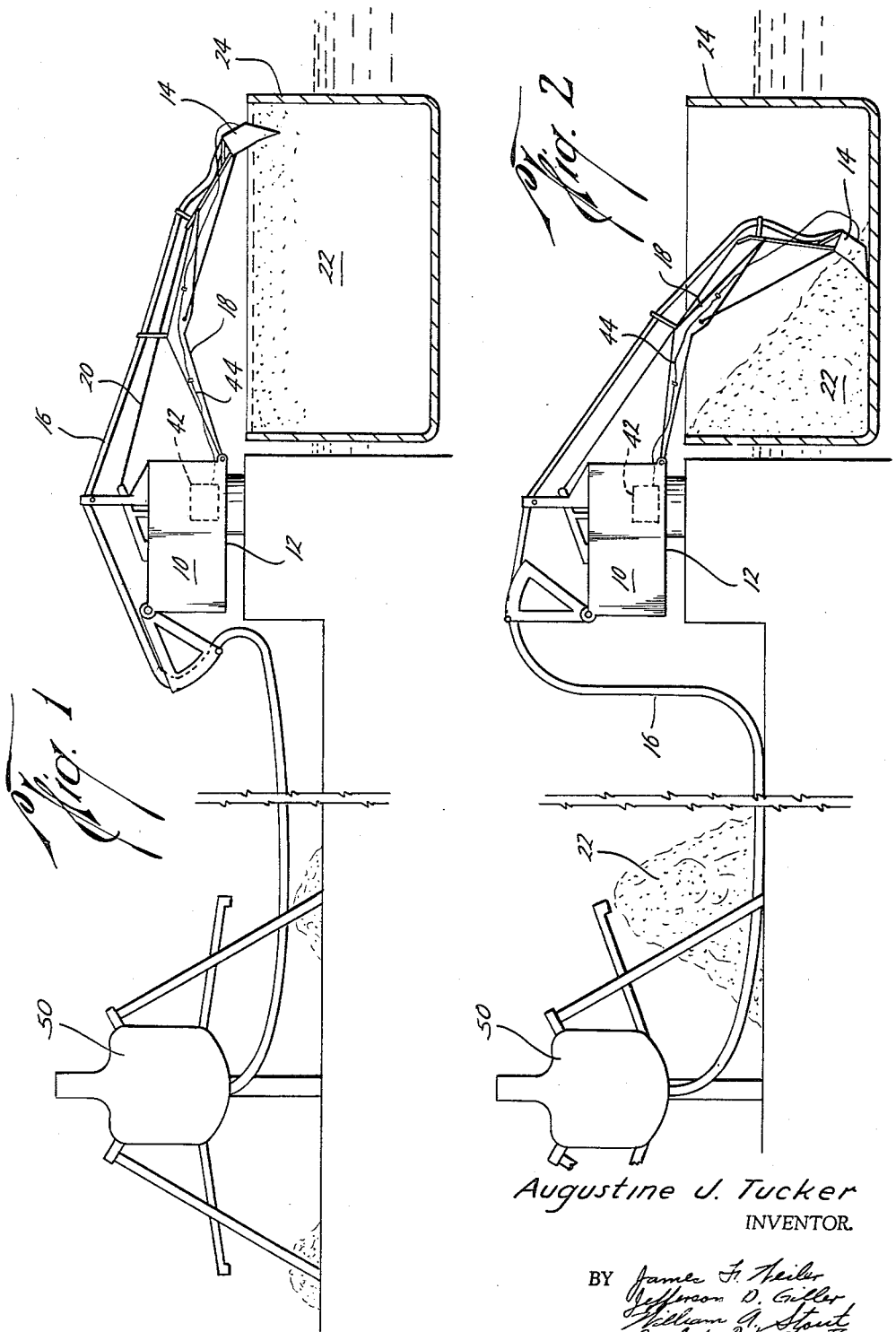
Augustine J. Tucker
INVENTOR.
BY James F. Neiler
Jefferson D. Giller
William A. Stout
Paul L. DeVerter II
ATTORNEYS Feb. 25, 1964 A. J. TUCKER 3,122,398
MATERIAL HANDLING APPARATUS
Filed Dec. 6, 1961 2 Sheets-Sheet 2
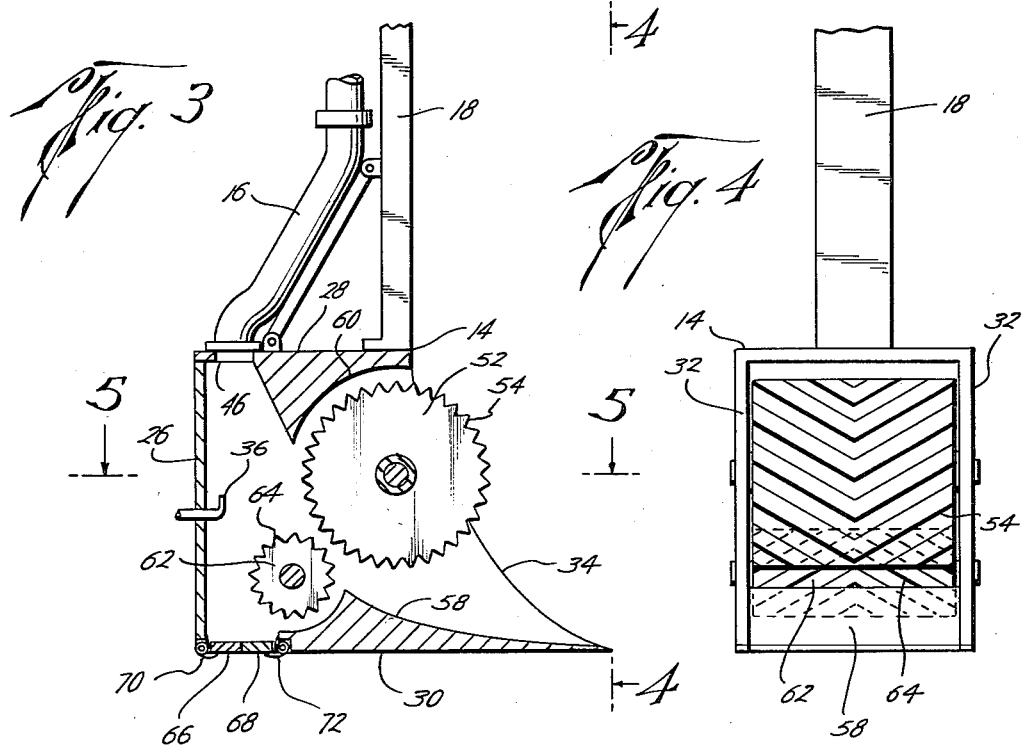
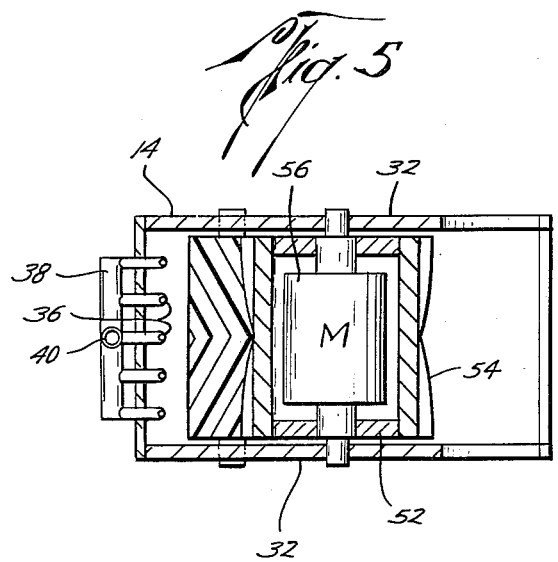
Augustine J. Tucker
INVENTOR.
BY
ATTORNEYS

United States Patent Office

3,122,398
Patented Feb. 25, 1964

3,122,398
MATERIAL HANDLING APPARATUS
Augustine J. Tucker, P.O. Box 13152, Houston, Tex.
Filed Dec. 6, 1961, Ser. No. 157,505
6 Claims. (Cl. 302—58)

The present invention relates to a material handling apparatus, and more particularly relates to a material handling apparatus used to move bulk or granular material from its natural location or from locations where it has been accumulated such as in storage yards or on ships.

The idea of moving granular material through a pipeline by suspension in a high velocity gas stream is generally old. However, in attempting to mine or move accumulations of bulk material it has been found that these materials usually have acquired surface crusting, are compacted into a dense semi-solid state and may be damp, wet, fermented, congealed or otherwise stuck together. Under such conditions these materials cannot be suspended in a gas stream and moved through a pipe line. The present invention is directed to an improvement in a mining and material loader which will quickly and economically handle and move material.

It is therefore a general object of the present invention to provide a material handling apparatus which will mechanically throw the material into suspension and then boost it to flow velocities by gas pressure thereby transporting the material in a granular form from one place to another.

A still further object of the present invention is to move bulk materials by suspending them in a gas flow after the material is mechanically broken up and thrown into suspension.

A still further object of the present invention is the provision of a material handling apparatus which includes a crane bucket having a driving cutter rotor having a plurality of teeth which cut into and break up the material, and throw it to the rear of the bucket where a gas lift discharges the granular material out a suitable conduit to a desired location.

Yet a further object of the present invention is the provision of a material handling apparatus having a suitable bucket for mining or moving material which is provided with a rotating cutter rotor in the mouth of the bucket which cuts into the material, crushes the material, and throws it into suspension across a plurality of compressed gas jets which cause the material to flow through a suitable discharge conduit.

Yet a further object of the present invention is the provision of a material handling bucket having a driving rotor which has a plurality of teeth which break up the material into granular form and pass it into a compressed gas stream for flowing the material through suitable outlet conduits or pipelines and which includes a dropout trap which may be spring loaded for releasing lumps of material too heavy or large to be transported by the gas stream.

A still further object of the present invention is the provision of a power bucket for insertion into the material to be handled and which has a driving and idling rotor which includes circumferentially spaced herringbone teeth for crushing and breaking up wet and/or compacted material and discharging it in the form of grains into a high velocity gas stream which flows through a suitable conduit thereby transporting the materials.

Yet a further object of the present invention is the provision of a material handling apparatus which includes a suitable power bucket for insertion into the material to be transported and includes a driving rotor having suitable teeth for breaking up the material into granular form and includes an internal motor in the rotor for rotating the rotor.

Other and further objects, features and advantages will be apparent from the following description of a presently preferred embodiment of the invention, given for the purpose of disclosure and taken in conjunction with the accompanying drawings, where like character references designate like parts throughout the several views, and where, FIGURE 1 is an elevational view illustrating the present invention in use in the process of beginning to unload a barge, FIGURE 2 is an elevational view similar to that of FIGURE 1 showing the present invention concluding the process of unloading a barge, FIGURE 3 is an elevational view, partly in cross-section, illustrating the bucket handling apparatus of the present invention, FIGURE 4 is a cross-sectional view taken along the line 4—4 of FIGURE 3, and FIGURE 5 is a cross-sectional view taken along the line 5—5 of FIGURE 3.

By way of example only, the present invention will be specifically described in its use as unloading a ship or barge; however, it is to be understood that the present invention may be used to transport material from one location to another whether or not the material is normally found in storage or in situ. Thus, the present invention can be used directly in mining operations to move such materials as bulk ore or can be used in initiating the long distance transporting of bulk materials from one place to another.

Referring to the drawings, and particularly to FIGURES 1 and 2, the present invention, generally designated by the reference numeral 10, is shown in use as unloading a barge. The apparatus 10 may include any suitable crane equipment such as crane 12 for suitable moving the power bucket 14 which will break up the compaction of the granular material and discharge it into a conduit 16 for transporting the material to another location as will be more fully described hereinafter.

The mechanical linkage of the booms and cables of the crane 12, here shown as a backhoe crane, is conventional and well known. The crane 12 may include the boom 18 and suitable manipulating lines such as 20 for moving the boom and consequently the shovel 14. However, contrary to the conventional action of a backhoe which is to fill, lift, swing and dump the material to be transported, the present crane 12 is primarily used merely for insertion of the bucket 14 into the material 22, here shown as being in a barge 24. The crane 12 merely insures that the bucket or shovel 14 is suitably inserted into the material 22 so as to provide a continuous material feed into the mouth of the bucket.

Referring now to FIGURES 3–5, the structure of the bucket 14 is best seen. The bucket 14 may include the usual back 26, top 28, bottom 30 and sides 32 and an open front portion 34 for the inlet of the material into the bucket. At the rear of the bucket a plurality of gas jets 36 are provided which may be suitably fed through a manifold 38 (FIGURE 5). Any suitable gas source such as air may be provided into the manifold inlet 40 from any suitable source such as a compressor 42 furnishing gas through a gas line 44 (FIGURES 1 and 2). It is noted in FIGURE 3 that the gas jets 36 are directed toward an outlet 46 in the bucket 14 whereby the high velocities from the jets 36 will suspend any granular material in a turbulent flow and carry the material out of the discharge outlet 46. A suitable conduit 16, preferably a flexible rubber hose, is connected to the discharge outlet 46 for transporting the granular material in a high velocity air stream to a suitable location such as the discharge separator 50 (FIGURES 1 and 2) for unloading to another vehicle (not shown) or on the ground as shown.

However, as previously mentioned the granular materials may be wet, fermented, congealed, compacted, or otherwise adhered together. Of course, the entire mass may be compacted to a semi-solid state which will range in particle size from fine dust and pellets to large lumps of materials of wide spread particle dimensions. These conditions would be true whether the material is normally found in storage or in situ. Therefore, a driving cutter rotor 52 having a plurality of circumferentially spaced teeth 54 is provided in the open mouth of the bucket 14. The purpose of this driving rotor 52 is cut into the base of the material pile, break up the compaction in the grains, and throw the material into suspension in the gas flow stream created by the jets 36. Thus, for this purpose, the driving rotor 52 is rotatably mounted in sides 32 of the shovel 14 and suitably driven, preferably by an internal electric motor 56. Preferably, the teeth 54 are of the herringbone design although any suitable cutting teeth could be used. Preferably the bottom wall 30 and the top wall 28 of the bucket 14 have suitable inclined interior faces 58 and 60, respectively, thereby allowing the use of a smaller rotor and yet providing suitable breaking up action by funneling the material toward the rotor 52 and a high speed dispersion of the material.

If desired, an idler rotor 62 having suitable teeth 64 may be provided interiorly of the bucket 14 and parallel to the driving rotor 52. Thus, the material is forced to pass between the rotors 52 and 62 and their respective teeth where they are crushed and reduced to suitable sizes for suspension in the gas fluid flow of the jets 36. The rotors 52 and 62 will pulverize the material to the desired size and discharge it directly into the gas stream where it is then boosted to flow velocities for discharge from the bucket 14. It is to be noted that the mechanical throwing of the material into suspension overcomes the basic weakness of all gas flow lift equipment which has the inherent difficulty of overcoming the inertia of materials heavier than gas by the application of a high velocity gas stream.

However, there will be certain particles of materials which will have a greater density or will not be crushed to a sufficiently small size to be carried by the gas stream. In that event, a dropout trap is provided in the bottom of the bucket 14. This dropout trap may include suitable doors 66 and 68 which are pivotally supported to the shovel bottom 30. Preferably, the doors 66 and 68 are spring loaded and held closed by the springs 70 and 72 and thus will release the drop out lumps when the dropout compartment becomes full. But, of course, any suitable actuation mechanism may be provided.

In use, it will be noted that the present apparatus will be continuously moving and transporting the material from one place to another and thus save time and consequently expense in the handling of material. Referring to FIGURES 1 and 2, the power shovel 14 is merely inserted into the material 22 to be handled and is preferably positioned to obtain gravity feed of the material into the open front 34 of the bucket 14. Thus, there is no requirement for the ordinary time consuming bucket action of filling, lifting, swinging and dumping of the conventional crane. The crane 12 merely insures that the power bucket 14 is inserted as deeply as possible into the lower portion of the material 22. Also a suitable power source for driving the rotor motor 56 (FIGURE 5) and a suitable source of gas flow such as the compressor 42 is provided.

Thus, as the power bucket 14 is inserted into the material 22 the rotating driving rotor 52 will cut into the material, break up the material into a suitable granular form, and throw it into suspension at the rear of the bucket 14. In addition, the idler rotor 62 coacts with the driving rotor 52 to provide a sufficient crushing action to reduce any lumps in the material to suitable size. As the material is discharged from the rotors the flowing gas from the jets 36 will provide sufficient flow velocities for moving the now granular material out of outlet 46 and through the conduit 16. From there the material may be suitably deposited to a discharge separator 50 or suitable storage, processing or further transportation. Any lumps of material which are of too great a density or are not sufficiently reduced in size by the rotors to be placed in gas suspension will fall to the rear of the shovel 14 in the dropout trap and accumulate on the top of the doors 66 and 68. The doors 66 and 68 may be spring loaded by the springs 70 and 72 so that the dropout trap will automatically be discharged when there has been a sufficient accumulation of dropout material. However, the bucket 14 may be removed and the dropout material discarded at another location by a suitable release mechanism (not shown).

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A material handling bucket for moving material comprising,
   (a) a material holding bucket having an open front portion for receiving materials,
   (b) a driving rotor having a plurality of circumferentially spaced teeth and mounted longitudinally in said open front portion,
   (c) means for rotating said rotor thereby breaking up and moving said material into said bucket,
   (d) an idler rotor rotatably mounted in said bucket parallel to said driving rotor thereby crushing said material,
   (e) an outlet conduit connected to said bucket behind said driving rotor,
   (f) a plurality of gas jets mounted interiorly of said bucket below the point that said rotors discharge said material into the bucket,
   (g) said jets directed toward said outlet conduit thereby carrying said material out of said conduit.

2. The invention of claim 1 wherein said means for rotating said rotor includes,
   (a) driving means mounted internally of said driving rotor.

3. The invention of claim 1 including a dropout trap at the bottom of said bucket whereby the larger pieces of material can be released.

4. A material handling apparatus for moving materials comprising,
   a material holding bucket having an open front portion for the receipt of material,
   said bucket having an outlet,
   a plurality of gas jets mounted interiorly of said bucket and directed toward said outlet,
   a cutting rotor having a plurality of circumferentially spaced teeth,
   said rotor positioned longitudinally in said open front portion thereby breaking up and moving material into the bucket,
   an idler roller having a plurality of teeth and positioned in said bucket and parallel to said cutting rotor so as to aid in crushing said material,
   said jets positioned in said bucket at a location so that the material moved into the bucket by the rotor is between the jets and the outlet.

5. A material handling apparatus for moving materials comprising,
   a material holding bucket having an open front portion for the receipt of material,
   said bucket, having an outlet, a plurality of gas jets mounted interiorly of said bucket and directed toward said outlet,
a cutting rotor having a plurality of circumferentially spaced teeth,
said rotor positioned longitudinally in said open front portion thereby breaking up and moving material into the bucket,
said jets positioned in said bucket at a location so that the material moved into the bucket by the rotor is between the jets and the outlet, and
a drop out trap at the bottom of said bucket.

6. The invention of claim 4 wherein the rotor teeth are herringbone shaped.

References Cited in the file of this patent

UNITED STATES PATENTS

| | | |
|---|---|---|
| 1,278,175 | Le Baron | Sept. 10, 1918 |
| 2,905,456 | Rafferty | Sept. 22, 1959 |
| 2,905,506 | Kristensen | Sept. 22, 1959 |
| 2,952,083 | Forkner | Sept. 13, 1960 |
| 2,981,527 | Kircher | Apr. 25, 1961 |

FOREIGN PATENTS

| | | |
|---|---|---|
| 1,206,221 | France | Aug. 24, 1959 |